Sept. 18, 1956 D. RICHMAN 2,763,717

COLOR-TELEVISION SIGNAL-TRANSLATING SYSTEM

Filed Dec. 18, 1951 2 Sheets-Sheet 1

INVENTOR.
DONALD RICHMAN
BY Laurence B. Dodds
ATTORNEY

*INVENTOR.*
DONALD RICHMAN
*BY* Laurence B. Dodds
ATTORNEY 2,763,717
Patented Sept. 18, 1956

1

2,763,717

COLOR-TELEVISION SIGNAL-TRANSLATING SYSTEM

Donald Richman, Flushing, N. Y., assignor to Hazeltine Research, Inc., Chicago, Ill., a corporation of Illinois Application December 18, 1951, Serial No. 262,309

14 Claims. (Cl. 178—5.4)

*General*

Figure 1:
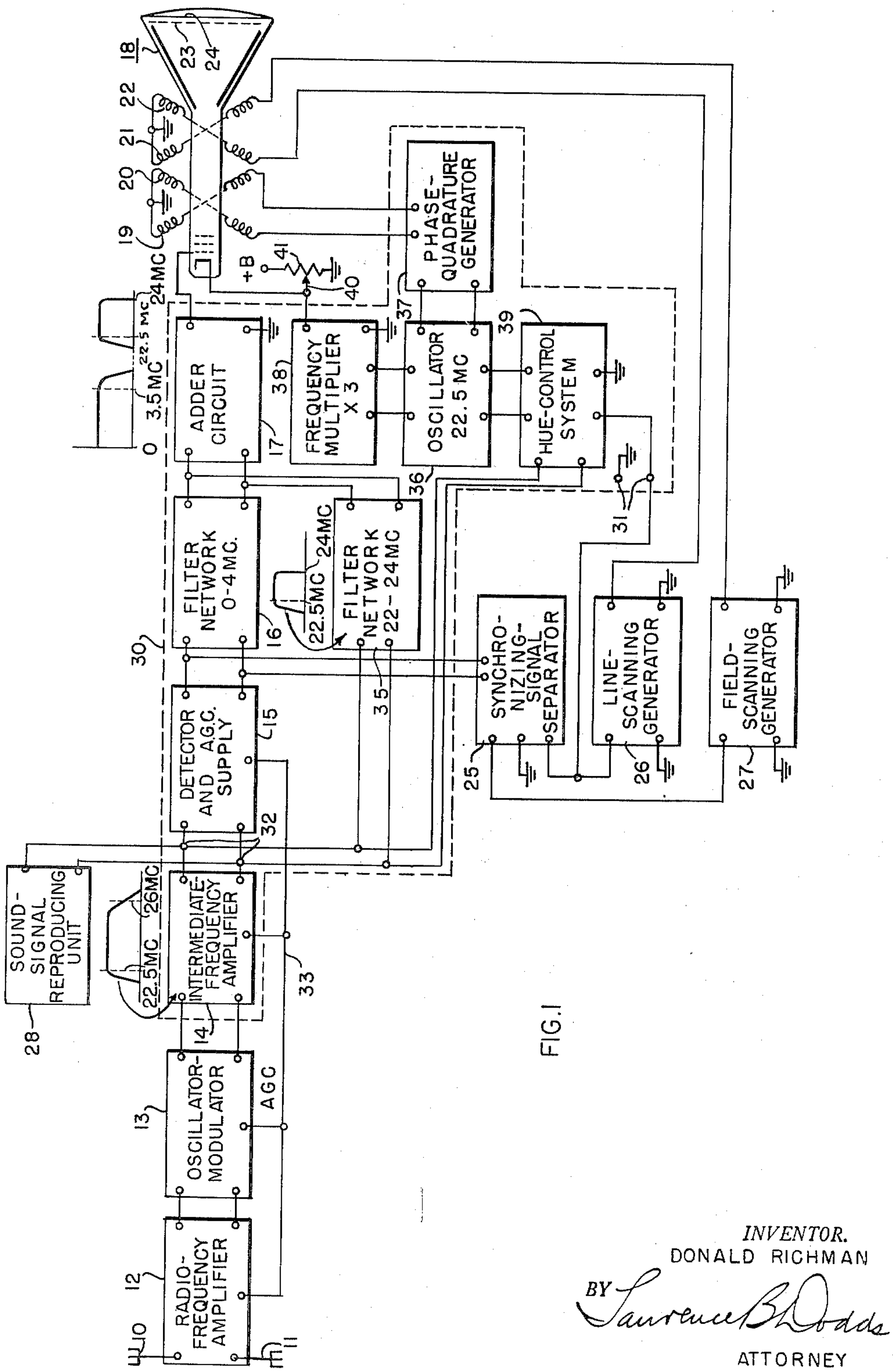

The present invention is directed to color-television signal-translating systems for translating a composite color-television signal. More particularly, the invention relates to such systems for use in color-television receivers which are employed in a compatible color-television transmitting and receiving system.

A compatible color-television system is one which is capable of developing at the transmitter a color-television signal which may be utilized by existing monochrome receivers without any modification of the circuits thereof to produce a black and white image without substantial degradation of resolution. Compatible color-television systems have been successfully demonstrated to the public and one such system is described in an article entitled "A six-megacycle compatible high-definition color television system" in the RCA Review, volume X, December 1949, No. 4, at pages 504–524, inclusive. An improved color-television system of this type is disclosed and claimed in the copending application of Bernard D. Loughlin, Serial No. 164,114, filed May 25, 1950, and entitled "Color-Television System."

In the two compatible color-television systems just mentioned, signals representative of the color of an image being televised are derived at the transmitter by a modulator or sampler system operating at a rate of about 3.5 megacycles. This modulator or sampler system develops a subcarrier wave signal which has a frequency of about 3.5 megacycles and which is modulated by components within the range of about 0–2 megacycles that are representative of the color of the televised image. The resulting subcarrier wave signal has a phase related to the hue and an amplitude related to the saturation of the color of the image. This subcarrier wave signal disappears in the presence of gray or white in the televised image. Additionally, a monochrome signal representative of the instantaneous brightness or the details of the televised image is derived and combined with the modulated subcarrier wave signal and also suitable synchronizing signals to develop a composite signal. The latter is employed to modulate a carrier-frequency wave signal which is transmitted for reception and use by a color-television receiver.

The receiver disclosed with reference to Fig. 4 of the above-mentioned article includes a sampler or synchronous detector system which is similar to that at the transmitter and is maintained in synchronous relation therewith by the received synchronizing signals. This sampling system, which is responsive to both the monochrome and the color information in the composite video-frequency signal supplied by the conventional modulation detector of the receiver, supplies individual ones of three video-frequency amplifiers with signals representative of respective ones of the three primary colors. The output circuits of the amplifiers are, in turn, connected to the input circuits of an image-reproducing apparatus which includes a cathode-ray tube for each of the primary colors.

2

In order that the image-reproducing apparatus may reproduce the fine details of the televised image, these amplifiers have a relatively wide pass band of about 0–4 megacycles and thus are effective to translate not only the unidirectional component of the output signal of the sampling system but also the 3.5 megacycle sine-wave component of the sampling signal. Due to this large 3.5 megacycle sine-wave component translated by each video-frequency amplifier, the image developed by the image-reproducing apparatus tends to have objectionable dots with dark spots in between the dots even in the white and gray areas when a subcarrier wave signal is not transmitted. The average observer finds these dots very objectionable since they do not integrate out except at very great viewing distances.

The receiver disclosed in Fig. 7 of the above-mentioned article and the improved receiver disclosed in the aforesaid copending application of Bernard D. Loughlin are not subject to the disadvantage just mentioned. In these receivers the video-frequency information which is derived by the conventional detector and is representative of the brightness or fine detail of the image is translated to the image-reproducing apparatus by a separate channel which bypasses the synchronous detector. Improved performance of these receivers including the development of an image which is free from objectionable dots and dark spots in the reproduced image results since the information representative of colors, after translation by the synchronous detector, is applied to the image-reproducing apparatus by a low-pass filter which has a cutoff frequency below 3.5 megacycles and thus is effective to eliminate the 3.5 megacycle component from the signals applied to the image-reproducing apparatus.

Tricolor cathode-ray image-reproducing tubes of both the single electron-gun and the three electron-gun types have recently been developed for use in color-television receivers. Such tubes eliminate the need for two of the three cathode-ray tubes and the elaborate optical system heretofore required in such prior color-television receivers employed in a compatible color-television system. Tricolor tubes of the type just mentioned and the receivers employing such tubes are described in an article entitled "General description of receivers for the dot-sequential color television system which employ direct-view tri-color kinescopes" in the RCA Review, volume XI, June 1950, No. 2, at pages 228–232, inclusive.

When a three-gun type of tricolor tube is employed in place of the three cathode-ray tube image-reproducing apparatus in a color-television receiver, such as that disclosed in Fig. 4 of the article in the December 1949 issue of the RCA Review, the color image reproduced by the three-gun type of tube has a visible dot structure which is particularly noticeable in the white and gray areas of the image and this dot structure is annoying to the viewer. However, when a receiver such as that disclosed in Fig. 7 of the article in the December 1949 issue of the RCA Review and the one disclosed in the above-mentioned copending application of Bernard D. Loughlin employs the three-gun type of tricolor cathode-ray tubes, the image produced thereby is not subject to the annoying dot structure since the 3.5 megacycle sine-wave component of the signals applied to the input circuits of the three electron guns has been eliminated. Consequently, a high-quality image is developed by such a receiver.

It has been determined experimentally that it is particularly desirable that the image produced by a color-television receiver employing a tricolor cathode-ray image-reproducing device be free from the annoying dot structure and this fact is now well recognized in the art as pointed out in the article entitled "Progress in dot-sequential color TV" in the February 1951 issue of the publication "Electronics."

Fig. 1 of the aforesaid article in the June 1950 issue of the RCA Review discloses a color-television receiver employing a three electron-gun tricolor tube in which high-level time-sequential sampling of the composite video-frequency signal is effected within the envelope of the tube by controlling the intensity of the individual electron beams at a 3.5 megacycle rate. Since the sampling operation occurs in the tube itself, it is not possible to employ filter or integrating networks following the sampling operation to remove the 3.5 megacycle sine-wave component which produces a visible dot structure in the white and gray areas of the reproduced image. Consequently, the quality of the image produced by such a receiver is not as satisfactory as may be desired.

Figures 1A, 2:
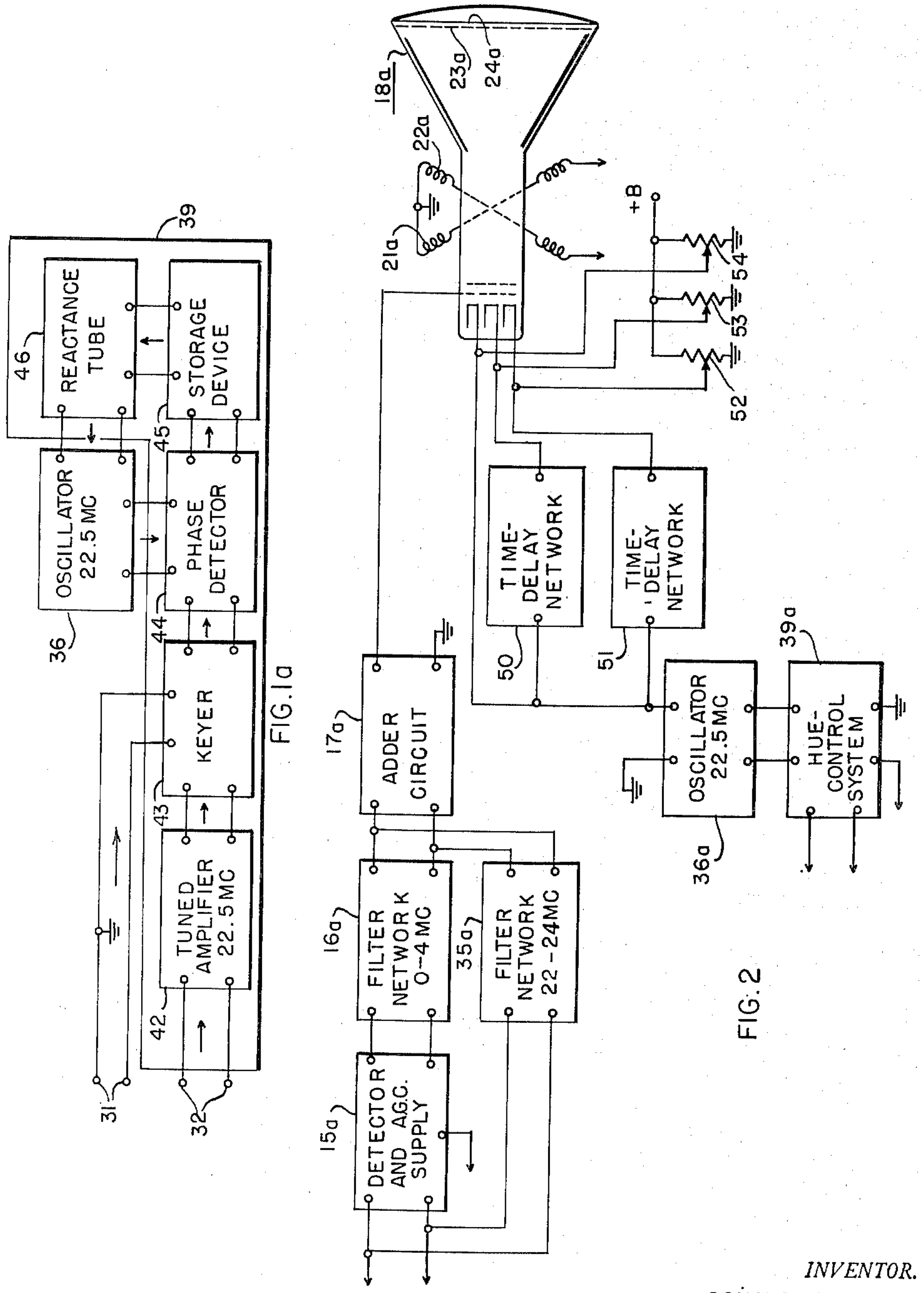

In a color-television receiver employing a single-gun tricolor display tube, such as is represented in Fig. 2 of the aforesaid article in the June 1950 issue of the RCA Review, high-level time-sequential sampling of the applied composite video-frequency signal at approximately a 3.5 megacycle rate is accomplished automatically within the display tube by an auxiliary circular deflection of the cathode-ray beam across the individual phosphor groups which fluoresce in the three primary colors and which are representative of individual picture elements. Each group contains three circular phosphor dots disposed in a triangular arrangement. The image developed by the receiver employing such a tube also has a noticeable undesired visible dot structure since it is not possible to employ filter networks within the tube to remove the 3.5 megacycle component.

The visibility of the picture elements or dots in a color-television receiver such as one employing a high-level sampling may be reduced by considerably defocusing in the horizontal direction the scanning spot produced by the electron beam. Defocusing is ordinarily undesirable since it results in an unwanted loss in horizontal resolution or the ability of the reproduced image to resolve fine details.

It is an object of the invention, therefore, to provide a new and improved color-television signal-translating system for use in a color-television receiver effecting high-level sampling of the received picture signal and which avoids the above-mentioned disadvantages of prior such color-television receivers.

It is another object of the invention to provide a new and improved color-television signal-translating system for use in a color-television receiver effecting high-level sampling of the received picture signal and which is capable of reducing the visibility of the dot structure in the reproduced color image.

It is a further object of the invention to provide a new and improved color-television signal-translating system for use in a color-television receiver employing a direct-view tricolor cathode-ray image-reproducing tube.

It is a still further object of the invention to provide a new and improved color-television signal-translating system, for use in a color-television receiver employing a tricolor cathode-ray tube, which is effective to reduce the visibility of the dot pattern in the reproduced image without impairing the ability of the image to resolve fine details.

It is an additional object of the present invention to provide a new and improved color-television signal-translating system for use in a color-television receiver employing a tricolor cathode-ray image-reproducing tube and which reduces the visibility of the dot structure in the reproduced image without an undesirable amount of defocusing of the scanning spot produced by the electron beam of the image-reproducing tube.

In accordance with a particular form of the invention, a color-television signal-translating system for an image-reproducing apparatus comprises a circuit for supplying a picture-modulated carrier-frequency wave signal effectively modulated by a composite video-frequency signal representative of an image in colors, the aforesaid composite signal including components representative of the instantaneous brightness of the image and including a subcarrier wave signal having a frequency in the vicinity of the highest frequency of the aforesaid instantaneous brightness components and modulated by components representative of the color of the image. The signal-translating system also includes circuit means coupled to said supply circuit for deriving from the aforesaid supplied wave signal a carrier-frequency wave signal modulated by color components and having a carrier frequency substantially higher than the highest frequency component of the composite video-frequency signal. The signal-translating system also includes a signal detector coupled to said supply circuit and responsive to the aforesaid supplied wave signal for deriving the modulation signal thereof including at least the instantaneous brightness components. The color-television signal-translating system further includes means coupled to the detector and to the circuit means for effectively combining with the same polarity the derived instantaneous brightness components and the derived color-modulated wave signal to develop a resultant signal. The signal-translating system also includes means for developing at least one control signal of a frequency and phase corresponding to the frequency and phase of the aforesaid derived carrier-frequency wave signal. The color-television signal-translating system additionally includes an image-reproducing apparatus control system coupled to said control-signal developing means and actuated by the control signal for decoding the resultant signal at the aforesaid corresponding frequency, whereby an image-reproducing apparatus operating in accordance with the resultant signal and the control signal reproduces a color image in which any spurious patterns due to the decoding process are of low visibility.

For a better understanding of the present invention, together with other and further objects thereof, reference is had to the following description taken in connection with the accompanying drawings, and its scope will be pointed out in the appended claims.

In the accompanying drawings, Fig. 1 is a schematic circuit diagram of a complete color-television receiver including a color-television signal-translating system in accordance with a particular form of the invention; Fig. 1*a* is a schematic circuit diagram of a portion of the system represented in Fig. 1; while Fig. 2 is a modified form of a color-television signal-translating system which may be employed in the receiver of Fig. 1.

*General description of Fig. 1 receiver*

Referring now more particularly to Fig. 1 of the drawings, the color-television receiver there represented is adapted to receive a carrier-frequency wave signal which may, for example, be of the type developed by a color-television transmitter described in the above-mentioned article in the December 1949 issue of the RCA Review. In that transmitter, signals representative of the primary colors of the image being televised are sampled at a rate of about 3.5 megacycles so that there is developed a color subcarrier wave signal which has a frequency of approximately 3.5 megacycles and which is modulated by the color-signal components. The modulated color subcarrier wave signal is combined with components representative of the brightness of the televised image and with the usual line-frequency and field-frequency synchronizing signals and color synchronizing components to produce a resultant signal utilized to amplitude-modulate the carrier-wave signal which is broadcast by the transmitter for use by a suitable color-television receiver.

The receiver represented in Fig. 1 of the drawings is of the superheterodyne type and includes for the interception of such a carrier-wave signal an antenna system 10, 11 coupled to a radio-frequency amplifier 12 of one or more stages. There is coupled to the latter unit in cascade, in the order named, an oscillator-modulator 13, an intermediate-frequency amplifier 14 of one or more stages having a pair of output terminals 32, 32, a detector and automatic-gain-control or A. G. C. supply 15, a suitable filter network 16 and an adder circuit 17 forming portions of a color-television signal-translating system 30, to be described more fully hereinafter, and a color-television image-reproducing apparatus which includes a single electron-gun tricolor cathode-ray image-reproducing tube 18. The filter network 16 may comprise a video-frequency amplifier having a 0–4 megacycle pass band. The amplifier may include a 3.5 megacycle trap to remove the 3.5 megacycle subcarrier wave signal. The A. G. C. supply of unit 15 is connected to the input circuits of one or more stages of the units 12–14, inclusive, by a control circuit conductor 33.

The tricolor cathode-ray image-reproducing tube 18 may be of the type described with reference to Fig. 2 of the article in the June 1950 issue of the RCA Review. This tube includes the usual electron-gun structure, beam-rotating coils 19 and 20 and also line-frequency and field-frequency scanning coils 21 and 22 disposed about the neck of the tube 18, the last-mentioned coils serving to deflect the electron beam in two directions normal to each other. The tube also includes a mask 23 containing a multiplicity of apertures each precisely aligned with reference to its predetermined group of three fluorescent areas or dots which form a fluorescent screen 24, individual areas being effective to fluoresce in individual ones of the three primary colors when excited by an electron beam. As previously mentioned, each of these groups contains three substantially circular phosphor dots disposed in a triangular arrangement. Operating potentials for the several electrodes of the cathode-ray tube 18 are supplied in a conventional manner from a suitable source (not shown).

The output circuit of the detector and A. G. C. supply 15 is also coupled to the input circuits of a line-scanning generator 26 and a field-scanning generator 27 through a synchronizing-signal separator 25. The output circuits of the generators 26 and 27 are coupled to the scanning coils 21 and 22 of the cathode-ray tube 18 in a conventional manner. An output circuit of the synchronizing-signal separator 25 for line-synchronizing pulses is connected to input terminals 31, 31 of the color-television system 30, these terminals being connected to a controlled circuit to be described subsequently. The output terminals 32, 32 of the unit 14 are also connected to additional circuits of the system 30 which will be described subsequently.

A sound-signal reproducing apparatus 28 is coupled to the output terminals 32, 32 of the intermediate-frequency amplifier 14 and may include one or more stages of intermediate-frequency amplification, a sound-signal detector, one or more stages of audio-frequency amplification and a sound-reproducing device.

The units 10–18, inclusive, and 25–28, inclusive, including the units 15, 16 and 17 of the color-television signal-translating system 30, which is constructed in accordance with the present invention and will be described in detail subsequently, may be of conventional construction and operation so that a detailed description and an explanation of the operation thereof are unnecessary herein.

*General operation of Fig. 1 receiver*

Considering briefly, however, the general operation of the above-described receiver as a whole, color-television wave signals intercepted by the antenna system 10, 11 are selected and amplified in the radio-frequency amplifier 12 and are supplied to the oscillator-modulator 13 where they are converted to intermediate-frequency signals. The latter, in turn, are selectively amplified in the intermediate-frequency amplifier 14 and are delivered to the detector and automatic-gain-control unit 15 and to the various units coupled to the terminals 32, 32. The modulation components of the intermediate-frequency signal are derived by the detector 15 and are supplied to the network 16 and the adder circuit 17 wherein they are combined with another signal applied to unit 17 from circuits to be described subsequently and the resultant signal is supplied to the control electrode-cathode input circuit of the cathode-ray tube 18. A control voltage derived by the automatic-gain-control supply circuit of unit 15 is applied by the conductor 33 as an automatic-amplification-control bias to the gain-control circuits of units 12, 13 and 14 to maintain the signal input to the detector of unit 15 within a relatively narrow range for a wide range of received signal intensities.

Unit 25 derives the synchronizing signals from the other modulation components of the composite color signal applied thereto by the detector 15. The line-synchronizing and the field-synchronizing signals derived by the separator 25 are separated from each other in the circuits thereof and are then supplied to individual ones of the generators 26 and 27 to synchronize the operation thereof. With proper operating potentials supplied to the various electrodes of the cathode-ray tube 18, an electron beam is produced by the latter and the intensity of this beam is controlled in accordance with the voltages impressed on the control electrode-cathode input electrodes of the tube 18 by the adder circuit 17. Saw-tooth current waves are generated in the line-scanning and field-scanning generators 26 and 27 and are applied to the scanning coils 21 and 22 to produce scanning signals, thereby to deflect the electron beam of the tube 18 in two directions normal to each other to trace a rectilinear scanning pattern or raster on the screen 24.

Synchronizing signals derived by the synchronizing-signal separator 25 are also applied by the terminals 31, 31 to an additional circuit of the color-television system 30, which circuit, as previously mentioned, will be more fully described hereinafter. These signals are utilized in a manner also to be explained subsequently to develop suitable control signals for application to the cathode and to the beam-rotating coils 19 and 20 of the cathode-ray tube 18. These control signals cyclically control the intensity of the electron beam and the circular deflection or rotation thereof with reference to the individual apertures in the mask 23 and, hence, with respect to individual groups of fluorescent areas on the fluorescent screen 24. The circular deflection of the electron beam automatically produces time-sequential sampling or decoding of the signal applied to the control-electrode circuit of the tube 18 by the adder circuit 17 and this operation, in conjunction with the tracing of the rectilinear scanning pattern on the screen 24, reconstructs the televised picture in colors on the screen of the cathode-ray tube.

The output signal of the intermediate-frequency amplifier 14 is also applied to the sound-signal reproducing apparatus 28 which is effective to derive the sound-signal modulation components of the received signal. These modulation components are suitably amplified and applied to the sound-signal reproducing device of unit 28 for conversion to sound.

*Description of color-television signal-translating system of Fig. 1*

Referring now to the color-television signal-translating system 30, that system comprises a circuit for supplying a picture-modulated carrier-frequency wave signal effectively modulated by a composite video-frequency signal representative of an image in colors, that composite signal including components representative of the instantaneous brightness or the details of the image and including a subcarrier wave signal having a frequency in the vicinity of the highest frequency of the brightness components and modulated by components representative of the color of the image. The circuit just mentioned comprises the output terminals 32, 32 of the intermediate-frequency amplifier 14, the picture-modulated carrier-frequency wave signal being a conventional intermediate-frequency color-television signal having a mean frequency of substantially 26 megacycles. The composite video-frequency signal which modulates the picture signal preferably includes 0–4 megacycle instantaneous brightness components and a substantially 3.5 megacycle subcarrier wave signal modulated by at least 0–1.5 megacycle and preferably 0–2 megacycle color components, the modulated subcarrier wave signal producing in the picture-modulated carrier-frequency wave signal a modulated color wave signal having a mean frequency of substantially 22.5 megacycles which is substantially higher than the highest frequency or 4 megacycle component of the aforesaid composite video-frequency signal.

The color-television signal-translating system 30 also includes a signal detector responsive to the supplied picture-modulated 26 megacycle wave signal for deriving the modulation signal thereof including at least the 0–4 megacycle brightness components. This signal detector includes the detector of unit 15 and preferably includes the 0–4 megacycle band-pass filter network 16 for selectively translating the brightness components. The network 16 may comprise a portion of a video-frequency amplifier stage.

The color-television signal-translating system 30 further includes circuit means for deriving from the supplied picture-modulated 26 megacycle wave signal a carrier-frequency wave signal modulated by color components and having a carrier frequency substantially higher than the highest frequency component of the composite video-frequency signal. By the term "frequency substantially higher than the highest frequency component of the composite video-frequency signal" is meant a frequency greater than twice that of the highest frequency component. The circuit means mentioned above is a wave-signal selector which comprises a band-pass filter network 35 preferably having a pass band of about 22–24 megacycles, the input circuit of the network being coupled to the output terminals 32, 32 of the intermediate-frequency amplifier 14.

The color-television signal-translating system 30 also includes combining means coupled to the detector 15 by way of the network 16 and to the filter network 35 for effectively adding the derived brightness components and the derived modulated color wave signal to develop a resultant signal including 0–4 megacycle brightness components and 22–24 megacycle color components. This combining means comprises the adder circuit 17, the input circuit of which is coupled to the output circuits of the units 16 and 35 and the output circuit of which is coupled to the control electrode-cathode circuit of the cathode-ray tube 18. The circuit 17, which may be of conventional construction and is effective to combine in the same polarity the output signals of the units 16 and 35, may comprise an additional stage of video-frequency amplification.

The color-television signal-translating system 30 further includes means for developing at least one control signal of a frequency corresponding to, that is equal to, the frequency of the 22.5 megacycle derived carrier-frequency wave signal. This means includes an oscillator 36 which develops a 22.5 megacycle sine-wave output signal and includes a conventional phase-quadrature generator 37 which is coupled between the output circuit of the unit 36 and the beam-rotating coils 19 and 20 for applying thereto two 22.5 megacycle signals which are in phase-quadrature relation with each other. The developing means also includes a conventional frequency multiplier or tripler 38 which is coupled between the output circuit of the oscillator 36 and the cathode of the cathode-ray tube 18 for developing a second control signal having a frequency three times that of the output signal of unit 36. A brightness control, comprising an adjustable tap 40 on voltage divider 41 connected between a source of potential +B and ground, is connected to the cathode of the tube 18. The developing means preferably also includes an automatic hue-control system 39, one input circuit of which is coupled to the synchronizing-signal input terminals 31, 31, another input circuit of which is coupled to the terminals 32, 32, and the output circuit of which is coupled to the input circuit of the oscillator 36. The hue-control system will be described in greater detail subsequently.

The color-television signal-translating system 30 additionally includes an image-reproducing apparatus control system actuated by the control signal developed in the output circuits of units 37 and 38 for effecting time-sequential sampling of the resultant signal applied to the control electrode of the cathode-ray tube 18 by the unit 17, whereby the cathode-ray tube operating in accordance with the resultant signal and the control signal reproduces a color image in which the dot structure effects previously described are of substantially reduced visibility. This control system comprises the cathode-ray beam-rotating or deflecting coils 19 and 20 which are coupled to the output circuit of the generator 37 for applying to those coils two 22.5 megacycle signals which are in phase-quadrature relation with each other.

Considering now the details of the hue-control system 39, that system may be one of several types which have been employed in color-television receivers and preferably comprises one of the type represented in Fig. 1*a* of the drawings. Unit 39 includes an amplifier 42 which is tuned to the 22.5 megacycle color wave signal applied to its input circuit from the output terminals 32, 32 of the intermediate-frequency amplifier 14. The output circuit of unit 42 is coupled to an input circuit of a keyer 43 which is arranged periodically to translate to its output circuit the signal applied by the unit 42 by the enabling action of a keying signal supplied to the input terminals of unit 43 from the terminals 31, 31. The output circuit of the unit 43 is coupled to an input circuit of a phase detector 44 which also has an output circuit coupled to a storage device 45 such as a condenser. The device 45, in turn, is coupled to a reactance tube 46 which supplies its output signal to the oscillator 36 to control the frequency thereof. The oscillator 36 and the phase detector 44 are coupled together to complete a familiar type of automatic-frequency-control system for the oscillator 36.

*Operation of color-television signal-translating system of Fig. 1*

Considering now the operation of the color-television signal-translating system 30, the over-all frequency-response characteristic of the intermediate-frequency amplifier 14 is represented above the amplifier with the picture-modulated carrier-frequency wave signal occurring at a frequency of about 26 megacycles and the color subcarrier wave signal having a frequency of about 22.5 megacycles. The detector 15 and the filter network 16 in a conventional manner derive from the output signal of the intermediate-frequency amplifier the modulation signal including 0–4 megacycle brightness components and also the 3.5 megacycle subcarrier wave signal and apply this information to the input circuit of the adder circuit 17. At the same time, the filter network 35 selects the 22–24 megacycle color components which include the 22.5 megacycle color subcarrier wave signal and also applies this information to the adder circuit 17. The latter combines or adds these components and produces a resultant signal, which occupies a pass band similar to that represented above the unit 17 and is applied to the control electrode-cathode input circuit of the cathode-ray tube 18.

Referring for the moment to Fig. 1*a*, the output signal of the intermediate-frequency amplifier 14 is also applied by the terminals 32, 32 to the amplifier 42 which selectively amplifies the 22.5 megacycle color wave signal and applies it to the keyer 43. The signal-translating circuit of the latter is periodically enabled or opened for the translation of the 22.5 megacycle signal by a keying signal in the form of the line-synchronizing pulses derived from the synchronizing-signal separator 25 of Fig. 1 and applied by the terminals 31, 31 to the input circuit of the keyer. Accordingly, bursts of the 22.5 megacycle signal are periodically applied by the unit 43 to the phase detector 44. The oscillator 36 also supplies a signal having a frequency of substantially 22.5 megacycles to the phase detector and the latter, in the well-known manner, develops an output signal which is proportional to the phase difference between the signal from the unit 43 and that from the oscillator 36. This output signal is integrated by the storage device 45 and applied as a control signal to the reactance tube 46 which, in turn, develops a control effect for application to the oscillator 36 to adjust the frequency and phase of its output signal effectively to that of the 22.5 megacycle color subcarrier wave signal applied to the phase detector 44. This action, therefore, effects automatic hue control or automatic color phasing of the developed 22.5 megacycle signal with the color subcarrier wave signal developed at the transmitter to assure faithful color reproduction at the receiver. The automatic hue-control system 39 is relatively immune to undesired noise since the keyer 43 is in a non-translating condition except during brief intervals corresponding to the intervals of the line-synchronizing pulses.

Referring now to Fig. 1, the 22.5 megacycle output signal of the oscillator 36 is applied to the frequency multiplier 38 wherein it is converted to a 67.5 megacycle signal which is, in turn, applied to the cathode of the cathode-ray tube 18. The 22.5 megacycle signal from the unit 36 is converted by the unit 37 into two quadrature sine-wave signals for application to the beam-rotating coils 19 and 20. While the foregoing operations are taking place, the saw-tooth currents in the windings 21 and 22 cause the cathode-ray beam striking the screen 24 to trace a rectilinear pattern. Since the mask 23 contains a multiplicity of apertures, each thereof being aligned with a particular group of three elemental areas on the screen 24 which fluoresce in individual ones of the three primary colors when excited by the cathode-ray beam, rotation of that beam by the phase-quadrature signals in the coils 19 and 20 as the beam is tracing its rectilinear pattern effects decoding or time-sequential sampling of the resultant signal from the unit 17 within the envelope of the tube 18 at a frequency of 22.5 megacycles. The time of occurrence and the duration of the signal samples are controlled by the 67.5 megacycle signal applied by the frequency multiplier 38 to the cathode of the cathode-ray tube 18, the tube normally being biased to cutoff but being rendered conductive by the peaks of the 67.5 megacycle signal.

The resultant signal applied to the control electrode-cathode circuit of the tube 18 includes a modulated color subcarrier wave signal having a frequency more than six times that of the 3.5 megacycle subcarrier wave signal applied to unit 17 from the network 16 and the sampling of the resultant signal within the envelope of the tube 18 occurs at a rate which is also more than six times that of the frequency of the subcarrier wave signal applied to the unit 17. The color subcarrier wave signal applied to the input circuit of the tube 18 is also much higher than the highest or 4 megacycle brightness component of the signal applied to the unit 17. As a result of the sampling of the resultant signal at the high rate mentioned above, dots and dark spots in the white and gray areas of the reproduced image, which would be produced if the sampling of the output signal of the detector 15 were carried out at the lower conventional 3.5 megacycle rate, have substantially reduced visibility in the reproduced image since the dots are smaller and very close together. In fact, the dot structure in the reproduced image may be made substantially invisible.

Since the units 16 and 17 supply wide band brightness information to the input circuit of the cathode-ray tube and also because high-level sampling occurs at a very high rate in the cathode-ray tube, the quality of the image produced by the tube 18 is comparable to that afforded by a color-television receiver of the type described in the above-mentioned copending application of Bernard D. Loughlin wherein low-level sampling is effected. Defocusing of the spot produced by the cathode-ray beam of the tube 18 to avoid undesired dot structure in the white and gray areas of an image reproduced thereby is ordinarily unnecessary when time-sequential sampling is effected at a high rate comparable to that described above. This, in turn, improves the resolution of the image reproduced by the tricolor cathode-ray tube.

*Description of color-television system of Fig. 2 and explanation of operation thereof*

Referring now to Fig. 2 of the drawings, there is represented a color-television system which is adapted for use in the receiver of Fig. 1 in place of the units 30 and 18 thereof. The system of Fig. 2 is substantially the same as the color-television signal-translating system 30 represented in Fig. 1. Accordingly, corresponding units are designated by the same reference numerals with a suffix *a* added thereto. The Fig. 2 system differs from the system 30 of Fig. 1 only in the use of a tricolor three electron-gun cathode-ray tube 18*a* in the place of a single-gun structure and a gating system for effectively controlling the application of the resultant signal from the unit 17*a* to the control electrode-cathode input circuits of the tube 18*a*. The angle of approach of each of the cathode-ray beams and the gating signals applied to the cathodes of the tube 18*a* determine which of the three fluorescent areas of each group of areas is selectively excited during the scanning operation. Accordingly, the tube 18*a* does not require beam-rotating coils as does the corresponding unit of Fig. 1. The output circuit of the 22.5 megacycle oscillator 36*a* is connected directly to one of the cathodes of the tube 18*a* and is also connected to individual ones of the other cathodes through individual time-delay networks 50 and 51. The networks just mentioned are so proportioned that the time delays afforded thereby are such that the units 36*a*, 50 and 51 supply to the three cathodes of the tube 18*a* control or gating signals occurring at a 22.5 megacycle rate but differing in phase by 120°. Resistors 52, 53 and 54 are employed in the cathode circuits of the tube 18*a* for controlling the brightness of the reproduced image. The units 36*a*, 50 and 51, previously mentioned, comprise a gating system which may be of the type disclosed with reference to the Fig. 1 receiver appearing in the cited article in the RCA Review of June 1950.

The operation of the color-television system of Fig. 2 is essentially the same as the corresponding system represented in Fig. 1 of the drawings. The resultant signal comprising the output signal of the unit 17*a* is applied to the control electrode of the tube 18*a* and the gating signals from units 36*a*, 50 and 51 are effective sequentially to turn on the beam current of each of the electron guns at a 22.5 megacycle rate and with a 120° phase displacement therebetween. The resultant signal applied to the control electrode from the unit 17*a* modulates the intensities of each of these cathode-ray beams at the instant those beams are turned on by the gating system. Due to the gating action of the gating system and also the orientation of the apertures in the mask 23*a* with reference to the groups of fluorescent elemental areas on the screen 24*a*, the rectilinear scanning action effected by the saw-tooth currents in the coils 21*a* and 22*a* cause an image in colors to be produced on the screen 24*a*.

From the foregoing descriptions of the various embodiments of the invention, it will be clear that a color-television system in accordance with the present invention is effective to reduce the visibility of the dot structure in the image reproduced by a tricolor cathode-ray image-reproducing tube. Furthermore, a system embodying the present invention is adapted for use in a color-television receiver and is effective to reduce the visibility of the dot structure in the reproduced image without requiring an undesirable amount of defocusing of the scanning beam of the image-reproducing tube.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A color-television signal-translating system for an image-reproducing apparatus comprising: a circuit for supplying a substantially 26 megacycle picture-modulated carrier-frequency wave signal effectively modulated by a composite video-frequency signal representative of an image in colors, said composite signal including 0–4 megacycle components representative of the instantaneous brightness of said image and including a substantially 3.5 megacycle subcarrier wave signal modulated by 0–2 megacycle components representative of the color of said image; circuit means coupled to said supply circuit for deriving from said supplied wave signal a 22.5 megacycle carrier-frequency wave signal modulated by color components; a signal detector coupled to said supply circuit and responsive to said supplied wave signal for deriving the modulation signal thereof including at least said instantaneous brightness components; means coupled to said detector and to said circuit means for effectively adding with the same polarity said derived instantaneous bridghtness components and said derived color-modulated wave signal to develop a resultant signal including 0–4 megacycle instantaneous brightness components and 22–24 megacycle color components; means for developing at least one control signal of a frequency of 22.5 megacycles and a phase corresponding to that of said 22.5 megacycle wave signal; and an image-reproducing apparatus control system coupled to said control-signal developing means and actuated by said control signal for effecting time-sequential sampling of said resultant signal at said 22.5 megacycle frequency, whereby an image-reproducing apparatus operating in accordance with said resultant signal and said control signal reproduces a color image in which any spurious patterns due to the sampling process are of low visibility.

2. A color-television signal-translating system for an image-reproducing apparatus comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal having a frequency in the vicinity of the highest frequency of said instantaneous brightnes components and modulated by components representative of the color of said image; circuit means coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said detector and to said circuit means for effectively combining with the same polarity said derived instantaneous brightness components and said derived color-modulated wave signal to develop a resultant signal; means for developing at least one control signal of a frequency and phase corresponding to the frequency and phase of said derived carrier-frequency wave signal; and an image-reproducing apparatus control system coupled to said control-signal developing means and actuated by said control signal for decoding said resultant signal at said corresponding frequency, whereby an image-reproducing apparatus operating in accordance with said resultant signal and said control signal reproduces a color image in which any spurious patterns due to the decoding process are of low visibility.

3. A color-television signal-translating system for an image-reproducing aparatus comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal having a frequency in the vicinity of the highest frequency of said instantaneous brightness components and modulated by components representative of the color of said image; a wave-signal selector coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said detector and to said selector for effectively combining with the same polarity said derived instantaneous brightness components and said derived color-modulated wave signal to develop a resultant signal; means for developing at least one control signal of a frequency and phase corresponding to the frequency and phase of said derived carrier-frequency wave signal; and an image-reproducing apparatus control system coupled to said control-signal developing means and actuated by said control signal for effecting time-sequential sampling of said resultant signal at said corresponding frequency, whereby an image-reproducing apparatus operating in accordance with said resultant signal and said control signal reproduces a color image in which any spurious patterns due to the sampling process are of low visibility.

4. A color-television signal-translating system for an image-reproducing apparatus comprising: a circuit for supplying a picture-modulated carrier-frequency wave signal effectively modulated by a composite video-frequency signal representative of an image in colors, said composite signal including synchronizing-signal components, components representative of the instantaneous brightness of said image, and a subcarrier wave signal having a frequency in the vicinity of the highest frequency of said instantaneous brightness components and modulated by components representative of the color of said image; circuit means coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said detector and to said circuit means for effectively combining with the same polarity said derived instantaneous brightness components and said derived color-modulated wave signal to develop a resultant signal; means including an oscillator and an automatic-frequency-control system for said oscillator coupled to said supply circuit and responsive to said synchronizing-signal components for developing at least one control signal of a frequency and phase corresponding to the frequency and phase of said derived carrier-frequency wave signal; and an image-reproducing apparatus control system coupled to said control-signal developing means and actuated by said control signal for effecting time-sequential sampling of said resultant signal at said corresponding frequency, whereby an image-reproducing apparatus operating in accordance with said resultant signal and said control signal reproduces a color image in which any spurious patterns due to the sampling process are of low visibility.

5. A color-television signal-translating system for an image-reproducing apparatus comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal having a frequency in the vicinity of the highest frequency of said instantaneous brightness components and modulated by components representative of the color of said image; circuit means coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said detector and to said circuit means for effectively combining with the same polarity said derived instantaneous brightness components and said derived color-modulated wave signal to develop a resultant signal; means including a gating system for developing a plurality of control signals having phases corresponding to the phases of said components representative of said color of said image and a frequency equal to the frequency of said derived carrier-frequency wave signal; and an image-reproducing apparatus control system coupled to said gating system and actuated by said control signals for effecting time-sequential sampling of said resultant signal at said frequency of said derived carrier-frequency wave signal, whereby an image-reproducing apparatus operating in accordance with said resultant signal and said control signals reproduces a color image in which any spurious patterns due to the sampling process are of low visibility.

6. A color-television signal-translating system for a cathode-ray image-reproducing apparatus comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal having a frequency in the vicinity of the highest frequency of said instantaneous brightness components and modulated by components representative of the color of said image; circuit means coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said detector and to said circuit means for effectively combining with the same polarity said derived instantaneous brightness components and said derived color-modulated wave signal to develop a resultant signal; means for developing at least one control signal of a frequency and phase corresponding to the frequency and phase of said derived carrier-frequency wave signal; and a cathode-ray beam-control system coupled to said control-signal developing means and actuated by said control signal for causing a cathode-ray beam to effect time-sequential sampling of said resultant signal at said corresponding frequency, whereby a cathode-ray image-reproducing apparatus operating in accordance with said resultant signal and said control signal reproduces a color image in which any spurious patterns due to the sampling process are of low visibility.

7. A color-television signal-translating system for an image-reproducing apparatus comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal modulated by components representative of the color of said image; circuit means coupled to said supply circuit for deriving from said supplied wave signal a carrier-frequency wave signal modulated by color components and having a carrier frequency substantially higher than the highest component of said composite video-frequency signal; a signal detector coupled to said supply circuit and responsive to said supplied wave signal for deriving the modulation signal thereof including at least said instantaneous brightness components; means coupled to said detector and to said circuit means for effectively adding with the same polarity said derived instantaneous brightness components and said derived color-modulated wave signal to develop a resultant signal; means for developing at least one control signal of a frequency and phase corresponding to the frequency and phase of said derived carrier-frequency wave signal; and an image-reproducing apparatus deflection system coupled to said control-signal developing means and actuated by said control signal for effecting time-sequential sampling of said resultant signal at said corresponding frequency, whereby an image-reproducing apparatus operating in accordance with said resultant signal and said control signal reproduces a color image in which any spurious patterns due to the sampling process are of low visibility.

8. A color-television signal-translating system for a tricolor cathode-ray image-reproducing tube comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal having a frequency in the vicinity of the highest frequency of said instantaneous brightness components and modulated by components representative of the color of said image; a tricolor cathode-ray image-reproducing tube including a cathode-ray source, an image screen, and means for scanning said screen with cathode rays from said source; circuit means coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said detector and to said circuit means for effectively combining with the same polarity said derived instantaneous brightness components and said derived color-modulated wave signal to develop a resultant signal; means for developing at least one control signal of a frequency and phase corresponding to the frequency and phase of said derived carrier-frequency wave signal; and an image-reproducing tube control system coupled to said control-signal developing means and said tube and actuated by said control signal for controlling said cathode rays and effecting time-sequential sampling of said resultant signal at said corresponding frequency, whereby said tube operating in accordance with said resultant signal and said control signal reproduces a color image in which any spurious patterns due to the sampling process are of low visibility.

9. A color-television signal-translating system for a tricolor cathode-ray image-reproducing tube comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal having a frequency in the vicinity of the highest frequency of said instantaneous brightness components and modulated by components representative of the color of said image; a tricolor cathode-ray image-reproducing tube including an image screen and means for developing a cathode-ray beam and scanning said screen with said beam; circuit means coupled to said supply circuit for deriving from said supplied wave signal a carrier-frequency wave signal modulated by color components and having a carrrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said detector and to said circuit means for effectively combining with the same polarity said derived instantaneous brightness components and said derived color-modulated wave signal to develop a resultant signal; means for developing at least one control signal of a frequency and phase corresponding to the frequency and phase of said derived carrier-frequency wave signal; and an image-reproducing tube control system coupled to said control-signal developing means and said tube and actuated by said control signal for causing said cathode-ray beam to effect time-sequential sampling of said resultant signal at said corresponding frequency, whereby said tube operating in accordance with said resultant signal and said control signal reproduces a color image in which any spurious patterns due to the sampling process are of low visibility.

10. A color-television signal-translating system for a tri-color cathode-ray image-reproducing tube comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal having a frequency in the vicinity of the highest frequency of said instantaneous brightness components and modulated by components representative of the color of said image; a tricolor cathode-ray image-reproducing tube including an image screen and means for developing a cathode-ray beam and scanning said screen with said beam; circuit means coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said detector and to said circuit means for effectively combining with the same polarity said derived instantaneous brightness components and said derived color-modulated wave signal to develop a resultant signal; means for developing at least one control signal of a frequency and phase corresponding to the frequency and phase of said derived carrier-frequency wave signal; and a cathode-ray beam-rotating means coupled to said control-signal developing means and said tube and actuated by said control signal for causing said cathode-ray beam to effect time-sequential sampling of said resultant signal at said corresponding frequency, whereby said tube operating in accordance with said resultant signal and said control signal reproduces a color image in which any spurious patterns due to the sampling process are of low visibility.

11. A color-television signal-translating system for a tricolor cathode-ray image-reproducing tube comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal having a frequency in the vicinity of the highest frequency of said instantaneous brightness components and modulated by components representative of the color of said image; a tricolor cathode-ray image-reproducing tube having a plurality of control electrode-cathode input circuits, a cathode-ray source, an image screen, and means for scanning said screen with cathode rays from said source; circuit means coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said input circuits, said detector and said circuit means for effectively combining with the same polarity said derived instantaneous brightness components and said derived color-modulated wave signal to develop and apply to said input circuits a resultant signal; means for developing a plurality of control signals of a frequency corresponding to the frequency of said derived carrier-frequency wave signal and phases corresponding to the phases of said components representative of said color of said image; and an image-reproducing tube control system coupled to said input circuits and said control-signal developing means and acutated by said control signals for controlling said cathode rays and effecting time-sequential sampling of said resultant signal at said corresponding frequency, whereby said tube operating in accordance with said resultant signal and said control signals reproduces a color image in which any spurious patterns due to the sampling process are of low visibility.

12. A color-television signal-translating system for a tricolor cathode-ray image-reproducing tube comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal having a frequency in the vicinity of the highest frequency of said instantaneous brightness components and modulated by components representative of the color of said image; a three electron-gun tricolor cathode-ray image-reproducing tube including three control electrode-cathode input circuits, three cathode-ray sources, an image screen, and means for scanning said screen with cathode rays from said sources; circuit means coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said three input circuits, said detector, and to said circuit means for effectively combining with the same polarity said derived instantaneous brightness components and said derived color-modulated wave signal to develop and apply to said input circuits a resultant signal: means for developing a plurality of control signals of a frequency corresponding to the frequency of said derived carrier-frequency wave signal and phases corresponding to the phases of said components representative of said color of said image; and a gating-control system coupled to said control-signal developing means and by said control signal and coupled to said control-signal developing means and said input circuits for controlling said cathode rays and effecting time-sequential sampling of said resultant signal at said corresponding frequency and at 120° phase intervals, whereby said tube operating in accordance with said resultant signal and said control signal reproduces a color image in which any spurious patterns due to the sampling process are of low visibility.

13. A color-television signal-translating system for a tricolor cathode-ray image-reproducing tube comprising: a circuit for supplying a picture-modulated carrier-frequency wave signal effectively modulated by a composite video-frequency signal representative of an image in colors, said composite signal including components representative of the instantaneous brightness of said image and including a subcarrier wave signal having a frequency in the vicinity of the highest frequency of said instantaneous brightness components and modulated by components representative of the color of said image; a tricolor cathode-ray image-reproducing tube including an image screen and means for scanning said screen with a single cathode-ray beam; circuit means coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said detector and to said circuit means for effectively combining with the same polarity said derived instantantous brightness components and said derived color-modulated wave signal to develop a resultant signal; means for developing phase-quadrature control signals of a frequency corresponding to the frequency of said derived carrier-frequency wave signal, one of said control signals having the phase of one of said components representative of said color of said image; and an image-reproducing tube control system coupled to said control-signal developing means and said tube and actuated by said control signals for rotating said cathode-ray beam during said scanning to effect time-sequential sampling of said resultant signal at said corresponding frequency, whereby said tube operating in accordance with said resultant signal and said control signals reproduces a color image in which any spurious patterns due to the sampling process are of low visibility.

14. A color-television signal-translating system for an image-reproducing apparatus comprising: a circuit for supplying a picture-modulated carrier-frequency wave signal effectively modulated by a composite video-frequency signal representative of an image in colors, said composite signal including components rerpesentative of the instantaneous brightness of said image and including a subcarrier wave signal having a frequency in the vicinity of the highest frequency of said instantaneous brightness components and modulated by components representative of the color of said image; circuit means coupled to said supply circuit for deriving from said supplied wave signal a carrier-frequency wave signal modulated by color components and having a carrier frequency substantially higher than the highest frequency component of said composite video-frequency signal; a signal detector coupled to said supply circuit and responsive to said supplied wave signal for deriving the modulation signal thereof including at least said instantaneous brightness components; means coupled to said detector and to said circuit means for effectively combining with the same polarity said derived instantaneous brightness components and said derived color-modulated wave signal to develop a resultant signal; means for developing a first control signal of the same phase as said derived carrier-frequency wave signal and of a frequency equal to the frequency of said derived carrier-frequency wave signal and for deriving from said first control-signal a second control signal having a frequency three times said frequency of said derived carrier-frequency wave signal; and an image-reproducing apparatus control system coupled to said control signal developing means and actuated by said control signals for effecting time-sequential sampling of said resultant signal at said related frequency, whereby an image- reproducing apparatus operating in accordance with said resultant signal and said control signals reproduces a color image in which any spurious patterns due to the sampling process are of low visibility.

References Cited in the file of this patent

"RCA's New Direct-View Tri-Color Kinescopes," Radio and Television News, June 1950, pages 46 and 47, 118.